R. KENNEDY.
MILKING MACHINE.
APPLICATION FILED MAR. 3, 1909.

933,466.

Patented Sept. 7, 1909.

7 SHEETS—SHEET 1.

Witnesses:
P. F. Nagle.
L. Douville.

Inventor:
Robert Kennedy.
By Wiedersheim Fairbanks.
Attorneys.

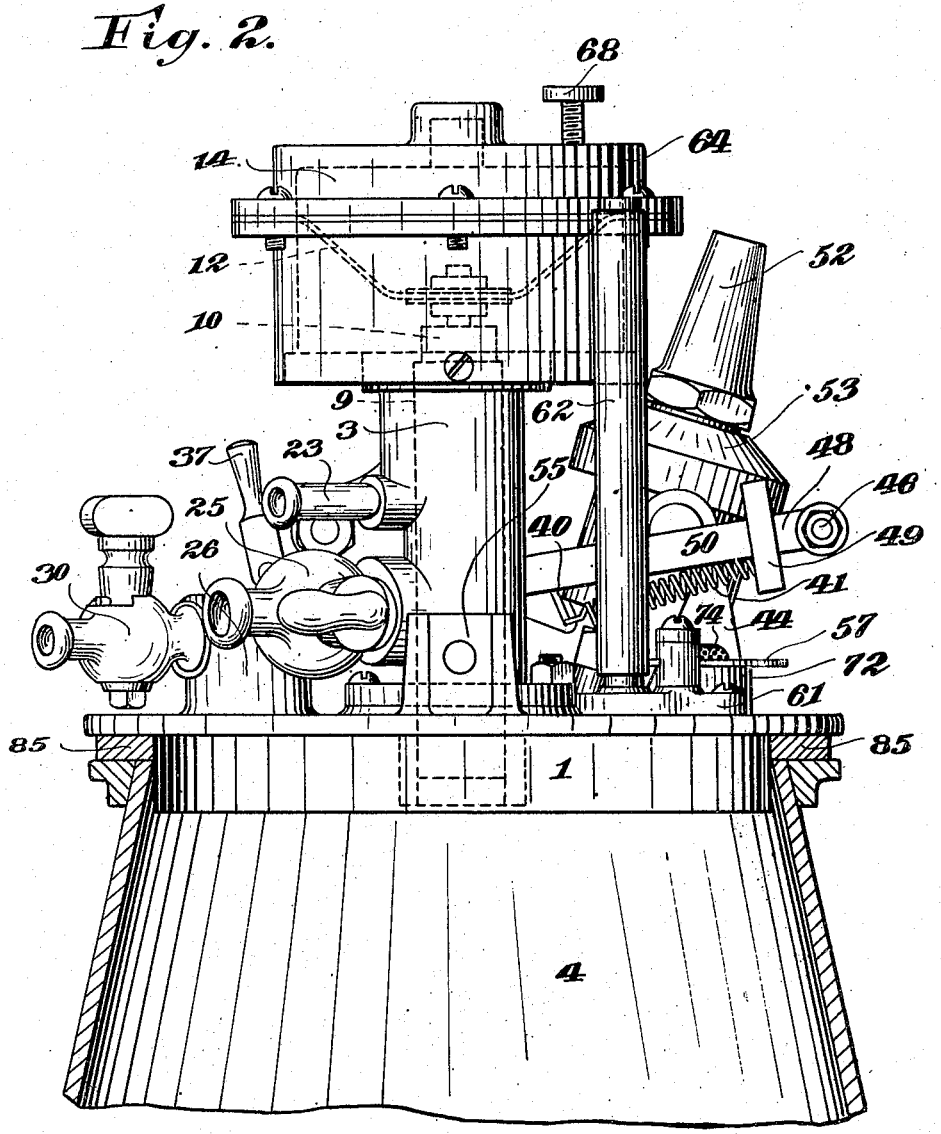

R. KENNEDY.
MILKING MACHINE.
APPLICATION FILED MAR. 3, 1909.
933,466.
Patented Sept. 7, 1909.
7 SHEETS—SHEET 3.
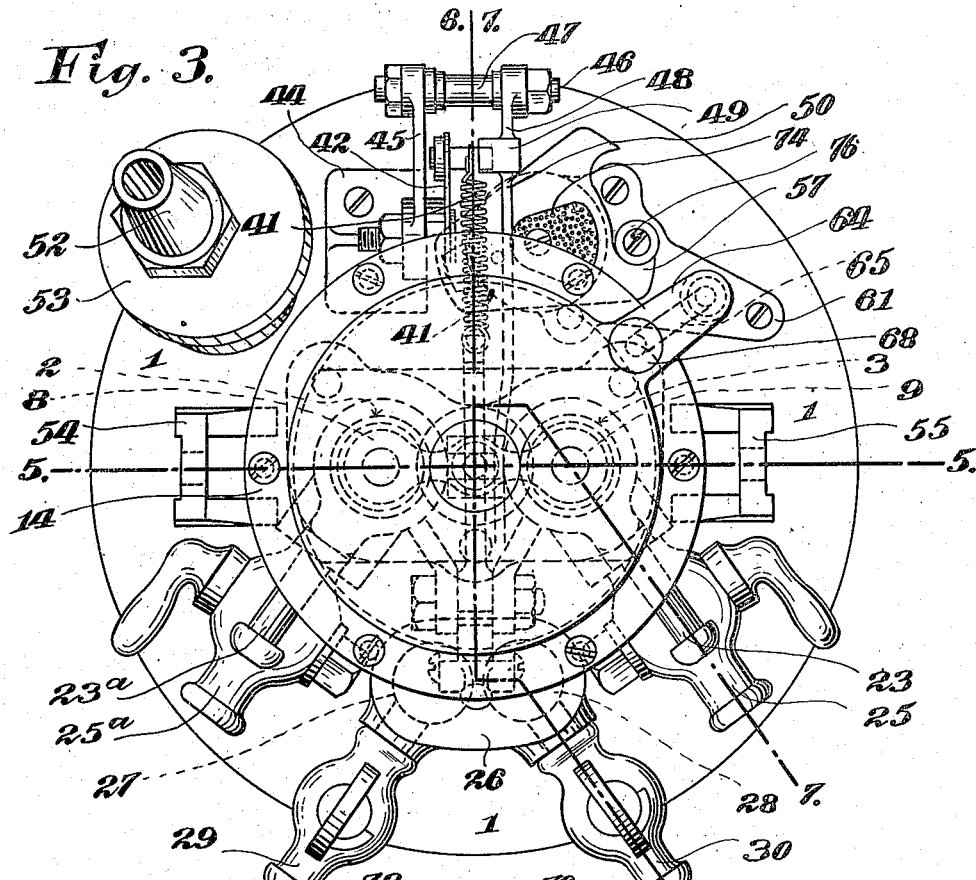
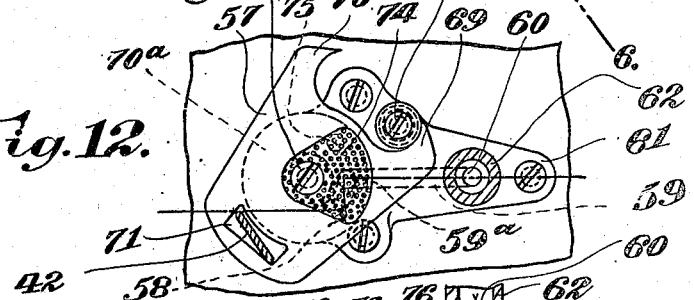
Witnesses:
P. F. Nagle.
L. Oaville.
Inventor
Robert Kennedy.
By Wiedersheim & Fairbanks
Attorneys.

R. KENNEDY.
MILKING MACHINE.
APPLICATION FILED MAR. 3, 1909.
933,466.
Patented Sept. 7, 1909.
7 SHEETS—SHEET 4.
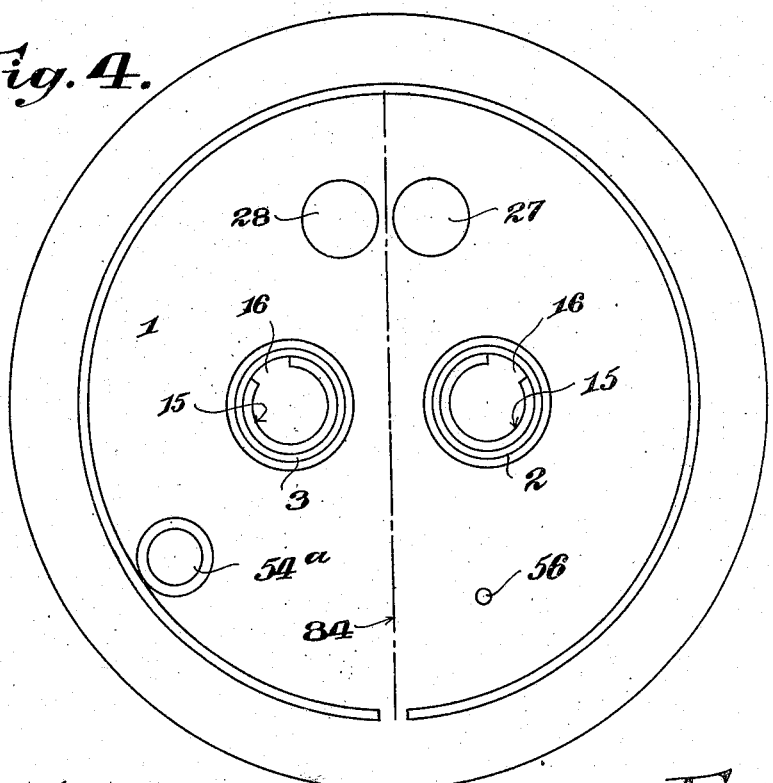
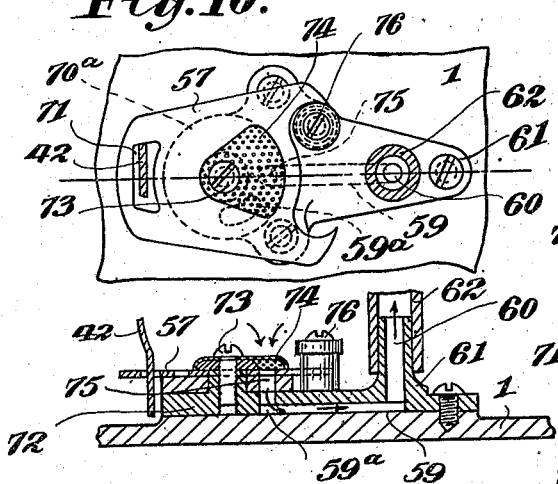
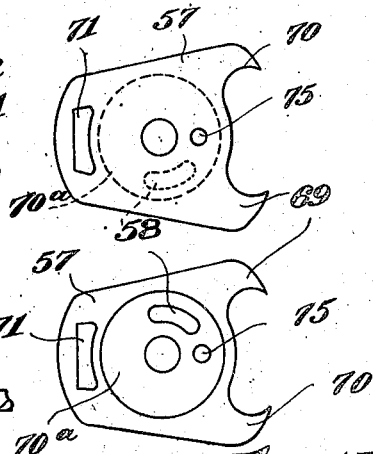
Witnesses:
P. F. Nagle.
L. Douville.
Inventor
Robert Kennedy.
By Wiedersheim & Fairbanks
Attorneys.

R. KENNEDY.
MILKING MACHINE.
APPLICATION FILED MAR. 3, 1909.
933,466.
Patented Sept. 7, 1909.
7 SHEETS—SHEET 5.
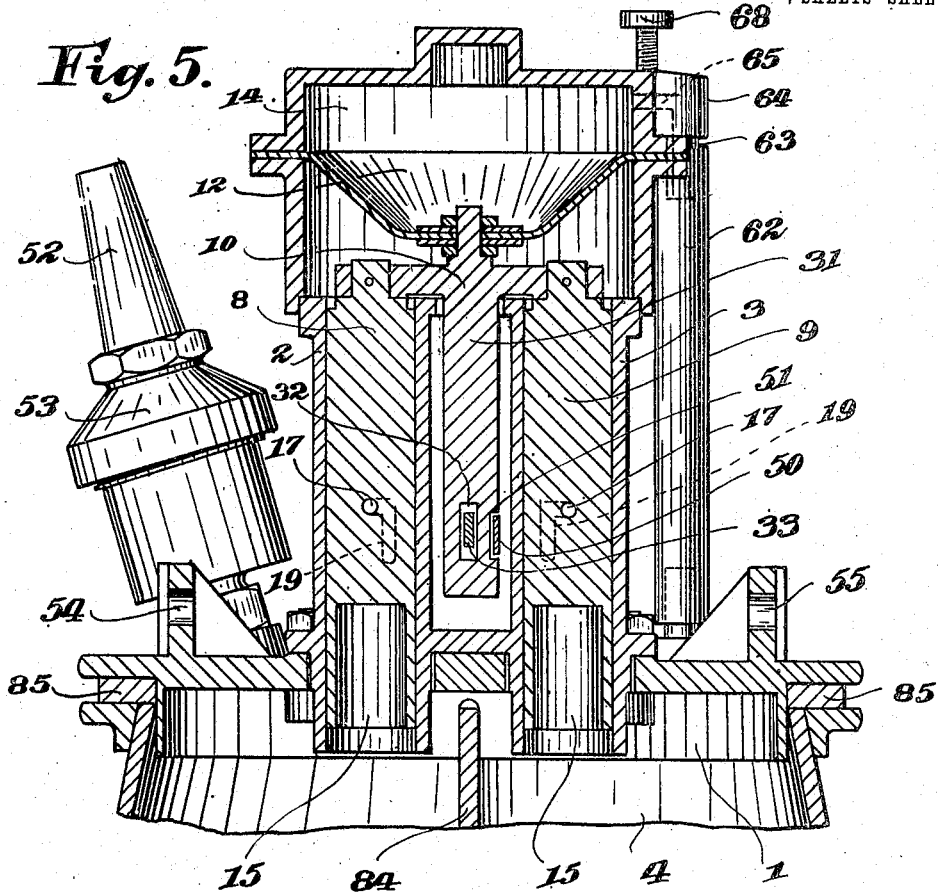
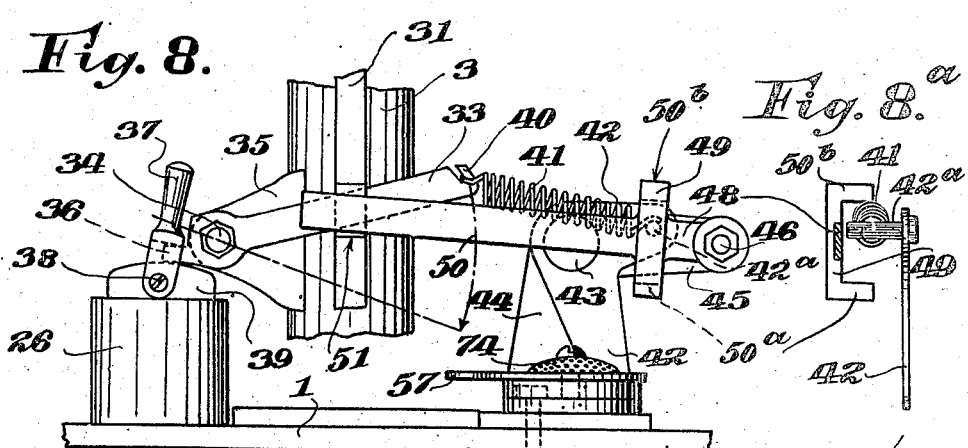
Witnesses:
P. F. Nagle.
L. G. Donville.
Inventor
Robert Kennedy.
By Wiedersheim & Fairbanks
Attorneys.

R. KENNEDY.
MILKING MACHINE.
APPLICATION FILED MAR. 3, 1909.

933,466.

Patented Sept. 7, 1909.
7 SHEETS—SHEET 6.

Witnesses:
P. F. Nagle.
L. Douville.

Inventor.
Robert Kennedy.
By
Wiedersheim & Fairbanks
Attorneys.

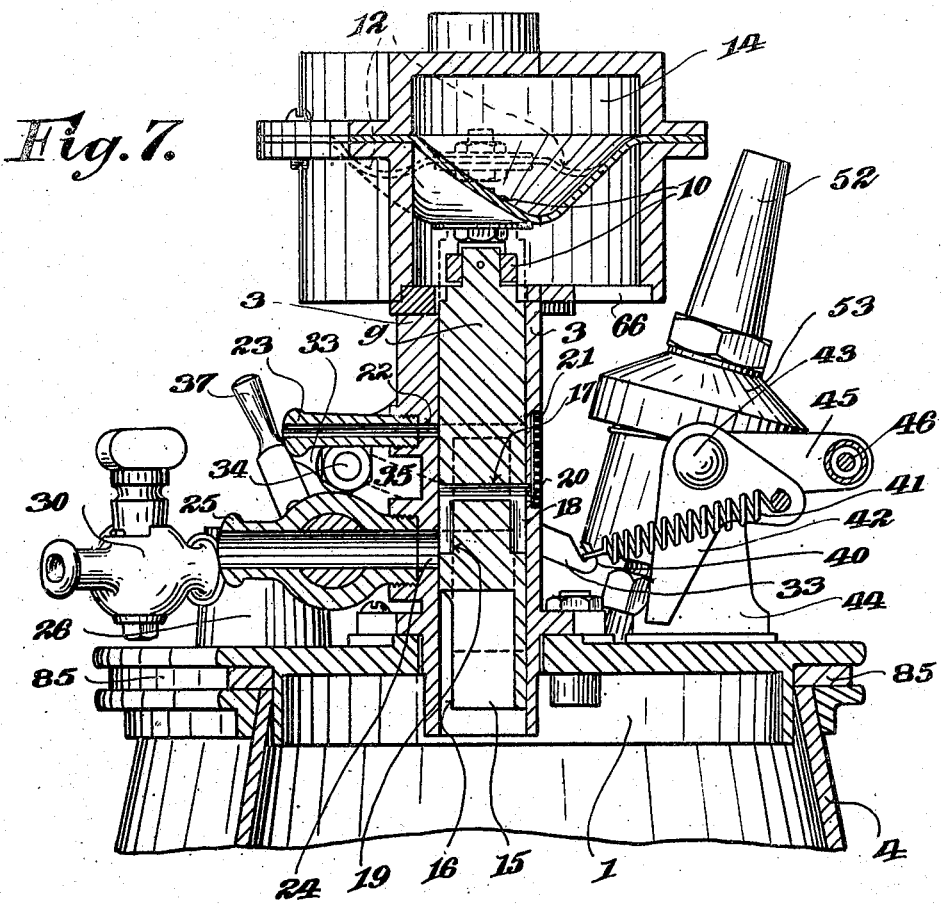
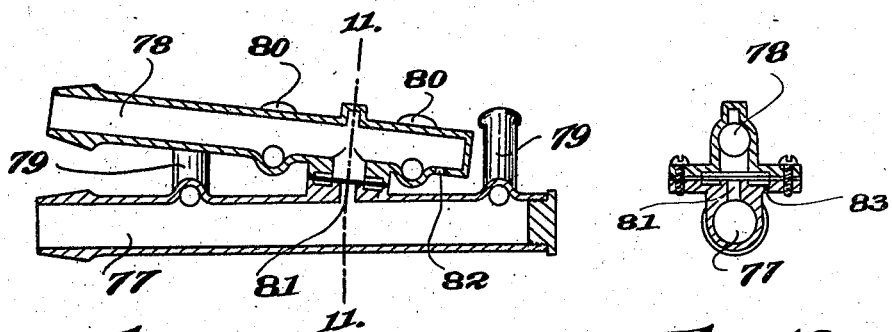

UNITED STATES PATENT OFFICE.

ROBERT KENNEDY, OF GLASGOW, SCOTLAND, ASSIGNOR TO LAWRENCE & KENNEDY, OF GLASGOW, SCOTLAND.

MILKING-MACHINE.

933,466.

Specification of Letters Patent.

Patented Sept. 7, 1909.

Application filed March 3, 1909. Serial No. 481,153.

*To all whom it may concern:*

Be it known that I, ROBERT KENNEDY, a subject of the King of Great Britain, residing at Glasgow, Scotland, have invented certain new and useful Improvements in Milking-Machines, of which the following is a specification.

This invention relates to suction milking machines of the class wherein single or double chambered teat cups are employed and the suction is caused to "pulsate" by means of suitable mechanism operated pneumatically.

Under the present invention the machine is so made that, as desired, the milking operation can be performed with single chambered teat cups and pulsating suction, or with double chambered teat cups having a constant suction in the one chamber and a pulsating suction in the other chamber, or by a combination of single chambered teat cups and double chambered teat cups. The machine is adapted for use in connection with a single or double compartment milk pail or receptable.

The invention comprises other features of novelty as hereinafter referred to.

In order that the invention may be properly understood I have hereunto appended explanatory drawings which show, by way of illustration or example, one convenient mode of constructing the machine.

Figure 1:
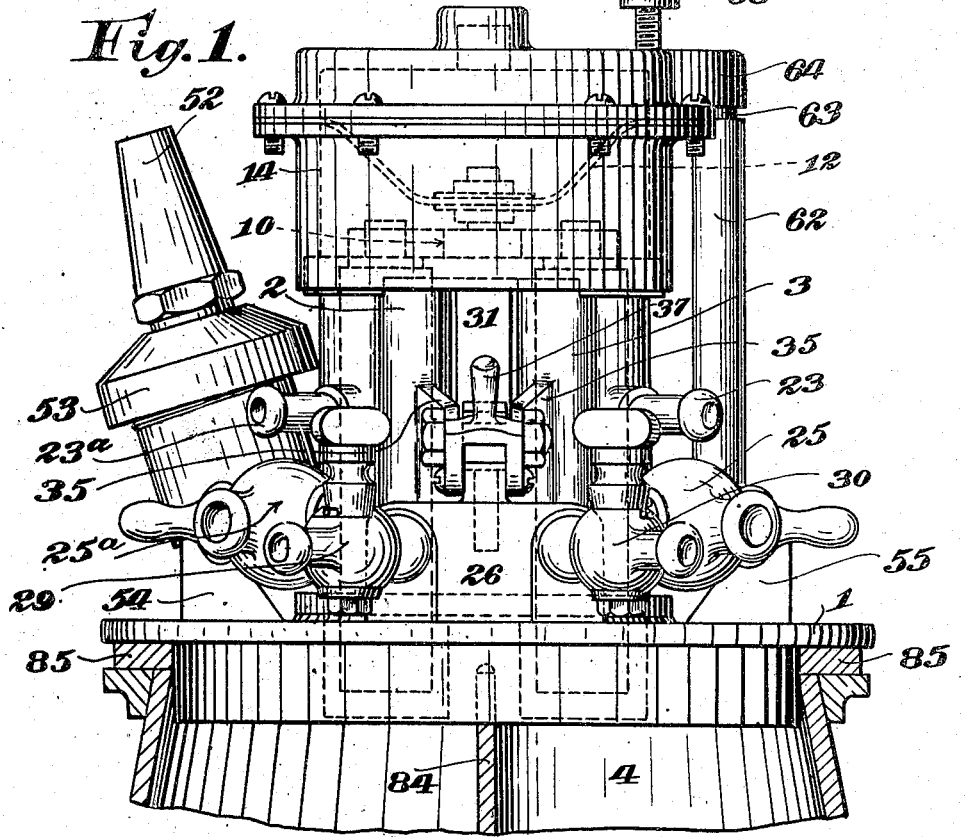
Figure 9:
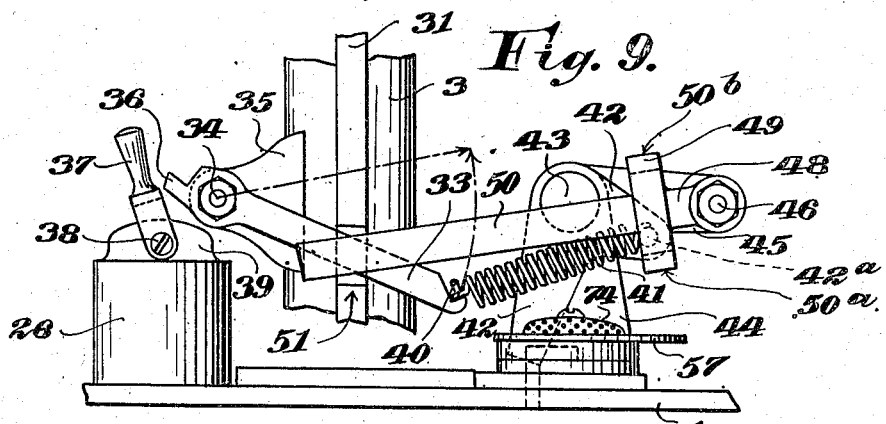
Figure 6:
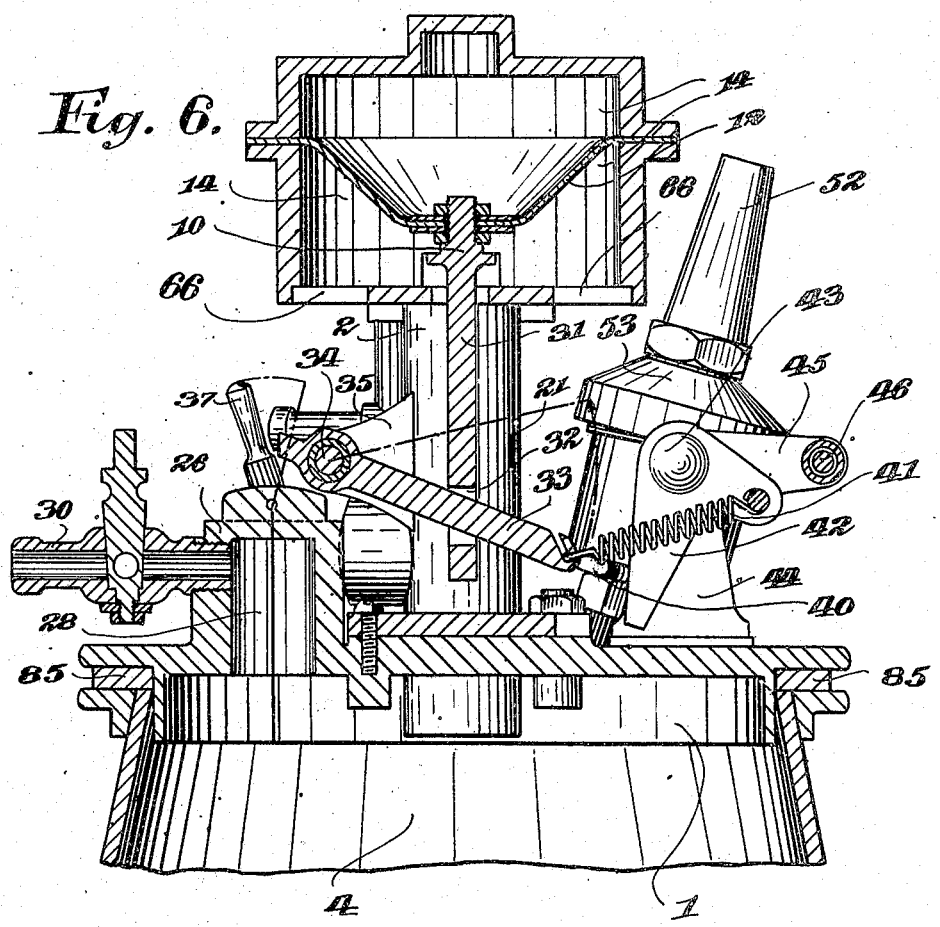
Figure 16:
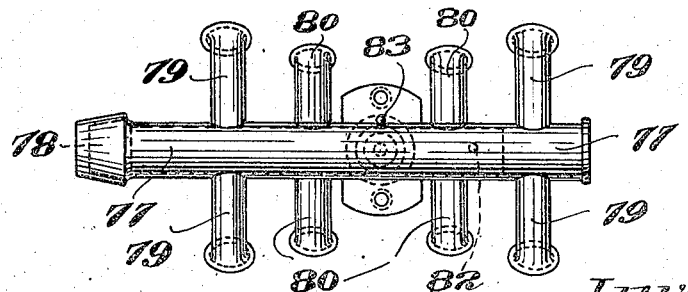

Figure 1 is a front elevation of the machine and showing part of the milk pail in section. Fig. 2 is a side elevation thereof. Fig. 3 is a plan thereof. Fig. 4 is an inverted plan thereof. Fig. 5 is a vertical section taken on the line 5, 5, Fig. 3. Fig. 6 is a vertical section taken on the line 6, 6, Fig. 3. Fig. 7 is a vertical section taken on the line 7, 7, Fig. 3. Fig. 8 is a side view of the valve operating gear locked in position, (and at the end of the upstroke). Fig. 8ª is an end view thereof. Fig. 9 is a similar view showing the mechanism unlocked, and at the end of the down stroke. Fig. 10 is a plan and Fig. 11 is a section showing the valve 57 in position for the admission of air. Fig. 12 is a plan and Fig. 13 a section showing the valve 57 in position for the vacuum action. Fig. 14 is a plan of the valve itself. Fig. 15 is an inverted plan of the same. Fig. 16 is an inverted plan of the "claw" or teat cup connector. Fig. 17 is a longitudinal section of the same in its correct position. Fig. 18 is a cross section taken on the line 11, 11, Fig. 17.

On the drawings, the same reference numerals wherever repeated indicate the same parts.

The machine shown on the drawings consists of a base plate 1, which is adapted to be fitted tightly on the top of the milk pail 4 and on this base plate are two cylinders 2, 3, arranged side by side and located within these cylinders are two plungers 8, 9, connected by a cross head 10 which is attached to a diaphragm 12 in the diaphragm chamber 14 mounted on top of the aforesaid cylinders 2, 3. Each plunger is made with a chamber 15 at its lower end which has an opening or slot 16 at one side thereof (see Figs. 4 and 7) and the plunger has an air hole or port 17 bored therethrough, the said hole or port communicating, at one end thereof, with a downwardly extending groove 18 in the surface of the plunger and, at the opposite end, communicating with a similar groove 19. Each cylinder is made with an air inlet port 20 which has a perforated dust cover 21 and is arranged to register, at certain times with the said groove 18. The cylinder 3 has an air port 22 which communicates with an outwardly projecting nipple 23, and also a port 24, which communicates with an outwardly projecting cock 25. The cylinder 2 is likewise provided with corresponding ports to 22, and 24, which communicate respectively with a nipple 23ª and cock 25ª. Each cylinder, 2 and 3, is open at its lower end as is shown clearly at Figs. 4, 5, and 7. On the base 1 is an upward extension or hood 26 which is made with two passages 27, 28, therein, as shown at Figs. 4 and 6, these passages being open at their underside as shown. Fitted to this upward extension are two cocks 29 and 30 arranged to communicate respectively with the passages 27 and 28 aforesaid.

The cross head 10 is made with a downward extension 31 which has a slot 32 in it at its lower end through which a lever 33 passes said lever being fulcrumed on a pin 34 carried by brackets 35 on the cylinders 2, 3, the lever being provided with a short projecting end or toe 36 which is adapted to be engaged by a forked catch 37 pinned, at 38, to a lug 39 on top of the extension 26, see particularly Figs. 8 and 9. The opposite end of the lever 33 has a catch 40 to which one end of a spiral spring 41 is secured, the other end of the said spring being attached to a pin 42ª at one end of a bell crank lever 42, fulcrumed, at 43, in a bracket 44 secured to the base 1. The bracket 44 is made with an arm 45 which projects out at right angles and to which is secured a pin 46 on which a sleeve 47 with an arm 48 is adapted to swivel, said arm 48 having a head 49 made in one with a flat bar 50 which latter passes through a recess 51 at the side of the cross head extension 31, see Fig. 5 and also Figs. 8 and 9.

52 is the connection for the suction pipe. 53 is a milk-vapor filter chamber on said suction connection and 54ª (Fig. 4) is the opening at the underside of the base plate 1 leading to said suction connection 52.

54, 55, are lugs to which the handle of the milking machine is attached.

56 (Fig. 4) is a hole bored through the base plate 1 and which communicates, on the one hand, with the milk pail and, on the other hand, with the oscillating valve 57 (see particularly Figs. 10, 11, 12, and 13) which when in the position shown at Figs. 12 and 13 communicates by means of a groove 58, at the underside of the valve 57 (see Figs. 14 and 15) with passages 59, and 60 in the plate 61 secured to the base 1 the passage 60 being in a branch to which the lower end of a rubber tube 62 is attached, the upper end of this tube being connected to a nipple 63 extending downwardly from an extension 64 (see Fig. 5) at one side of the cover of the diaphragm chamber 14. The nipple communicates by means of a passage 65, indicated in dotted lines at Figs. 3 and 5, with the upper compartment of the said diaphragm chamber the lower compartment of said chamber being open, to the atmosphere as clearly shown at 66, Figs. 6 and 7. The passage-way 65 can be regulated by means of a screw-down valve 68. The oscillating valve 57, as shown at Figs. 14 and 15, consists of a flat plate with horns 69, 70, thereon and, at its underside, has a disk portion 70ª and also a slotted part 71 the slot being made for the reception of the lower end of the bell crank lever 42. The valve is secured pivotally in place on the valve seat portion 72 of the plate 61 by means of a pin 73 which latter serves also to hold in place a perforated cover 74 which covers over the air inlet hole 75 in the valve.

76 is a pin with roller thereon with which the horns 69, 70, of the valve can engage.

Figs. 16, 17 and 18 show a claw or teat cup connector which can be used in connection with this milking machine when operating with double chambered teat cups. It is made in the usual manner with a milk tube 77 and air tube 78 and with milk tube branches 79 and air tube branches 80 connected respectively, by pipes, to the chambers of the teat cups. 81 is an air inlet passage leading to the milk tube 77 and 83 is an air inlet aperture between which intermittent communication is established by the diaphragm valve 81. 82 is a restricted air inlet orifice communicating with air tube 78.

As will be seen the apparatus has duplex plungers and duplex pipe connections and is specially adapted for use with double compartment pails, said pails being divided by a central partition 84 as shown at Figs. 1 and 5.

The gear for operating the valve 57 works in the following manner:—When the part 31 of the cross-head 10 is on its upward stroke in conjunction with the plungers 8 and 9, the slot 32 and recess 51 act on the levers 33, 50, the lever 33 being pulled up into the position of the dotted line at Fig. 9 and as shown in full lines at Fig. 8; the spring 41, as the lever 33 travels upward immediately it passes the dead points and as it is held at tension suddenly pulls over the lever 42, on the well-known so-called "kicker" principle, the position of the oscillating valve 57 being changed. Likewise at the down stroke of the part 31 and plungers 8, 9, the lever 33 and spring 41 throws the lever 42 over and again changes the position of the valve 57. In this manner the valve is suddenly changed at the end of the up and down strokes of the plungers thereby, as before stated, freely admitting air to or exhausting the air from the chamber 14 and so causing the reciprocating movement of the plungers 8 and 9.

The spring 41 partially may lose its tension and in order to effect the "throw over" in such event the bar 50 is provided, the projections 50ª, 50ᵇ, on said bar positively striking the pin 42ª of the bell crank 42 and throwing it over in conjunction with the spring 41.

Now presuming it is desired to milk two cows simultaneously with double chambered teat cups a constant suction being maintained in the inner chamber of each teat cup and a varying or pulsating suction in the outer chamber of each teat cup (we may here say that the teat cups may be of any suitable, usual, and well-known construction) then the *modus operandi* is as follows: The base plate is firmly secured on the mouth of the milk pail 4, as usual, and is fitted tight thereon by means of a rubber ring 85, the base plate forming the lid or cover of the pail. The milk pipe leading from the claw or pipe connector of the teat cups for the one cow is connected to the nose of the cock 30 while the air pipe leading from the same claw or pipe is connected to the nose of the cock 25. In a similar manner the milk pipe of the connector or claw of the teat cups for the other cow is connected to the cock 29 and the air pipe to the cock 25ᵃ. The pipe 52 is connected by means of a pipe connection to the usual suction apparatus so as to create a vacuum to the desired degree in the milk pail. So long as the hand catch 37 is caused to engage the toe 36 of the lever 33 the mechanism cannot operate but suction acts through the cocks 29, 30, on the teat cups and causes them to adhere to the teats of the cow and, when the said teat cups have been properly attached, the hand catch 37 can be moved so as to disengage the motor mechanism and allow the same to operate. The suction in the milk pail thereupon acts directly on the underside of each plunger 8, 9, and draws them downward the combined areas of said plungers 8 and 9 being less than the area of the diaphragm 12 which, as before stated, is open to the atmosphere at its underside. When the oscillating valve 57 moves through the valve gear 33, 41, 42, to the position shown at Figs. 12 and 13, which corresponds with the downward position of the plungers 8 and 9 and the position of the valve gear shown at Fig. 9, then, owing to the suction in the milk pail, the air in the diaphragm chamber 14 is exhausted therefrom through the passage 65 pipe 62, passages 60 and 59, groove 58 in the valve 57 and hole 56, the arrows in Fig. 13 indicating the rush of air downward to the milk pail. As a result of this rarefaction of the air in the chamber 14 the diaphragm 12 is pulled upward and, at the same time, pulls up the plungers 8 and 9 with the result that the opening 16 at the bottom of each plunger comes opposite the passages in the cocks 25, 25ᵃ, and allows the suction in the pail to act within the outer chambers of the teat cups and cause a rarefaction of air therein thereby allowing the lining or inner walls of said cups to expand in the usual manner. When the plungers reach the top of their stroke the valve 57 is automatically thrown over to the opposite position indicated at Figs. 10 and 11 by the action of the valve gear as will be hereinafter explained, and brings the air inlet hole 75, in the valve 57, over the hole 59ᵃ leading to the passage 59 in the plate 1, with the result that air rushes in through the perforated cover 74, see arrows Fig. 11, along the passage 59, up the pipe 62 and so to the diaphragm chamber 14 and destroys the vacuum therein with the result that the plungers are again drawn downward by the suction due to the vacuum within the pail and, when drawn downward, the passage 17 in conjunction with the passage 19 in each plunger establish communication between the air inlet orifices 20 and the cocks 25, 25ᵃ, thereby allowing air to pass into the outer chambers of the teat cups and reduce the vacuum therein with the result that the greater vacuum within the inner chambers of the teat cups causes the inner wall or lining of said cups to squeeze the cow's teats. Of course, a constant suction is maintained within the inner chambers of the teat cups and on the cow's teats owing to the fact that the cocks 29 and 30 are always in communication with the interior of the milk pail.

It will therefore be seen from the foregoing that the mechanism is such that a constant vacuum may be maintained within the inner chambers of the teat cups while a varying vacuum can be established in the outer chambers of the teat cups so as to cause the said cups to have a pulsating action on the cow's teats.

If so desired the milking can be carried on with the double chambered teat cups but with the constant suction in the outer chambers of the cups and the varying or pulsating suction in the inner chambers thereof in which event the milk pipes from the teat cups are simply connected to the cocks 25, 25ᵃ and the air pipes to the cocks 29, 30.

When working with single chambered teat cups the milk tube for the teat cups of the one cow is secured to the nose of the cock 25 and an air pipe is connected to the nozzle 23 and also to an air inlet branch on the claw or teat cup connector. The connections for the teat cups of the other cow are made in a similar manner to the cock 25ᵃ and nozzle 23ᵃ. As the operation is the same in both cases I will only describe that for one cow. When the apparatus is set in operation and the plunger 9 (operating in conjunction with the cock 25 and nozzle 23) ascends to the position shown in dotted lines in Fig. 7 then the recess 15 is in full communication with the cock 25 and the full or maximum suction acts at the teat cups, at the same time a regulated amount of air is supplied by the hole 20, the passage 18, 17, and nozzle 23 to the teat cup claw, or connector and drives the milk to the milk pail without a surging or churning action taking place in the milk tube. The air passes from the nozzle 23 through the teat cup connector and rushes down the suction pipe to the cock 25 and milk pail carrying the milk along with it. When the plunger descends to the position shown in full lines at Fig. 7 then the suction in the milk pail is cut off from the teat cups and the air from the nozzle 23 the vacuum in said cups being reduced to the minimum by the admission of air through the hole 20, passages 17 and 19 to the cock 25. It will thus be seen that the air supply through the nozzle 23 is only permitted when the maximum degree of suction is acting on the cow's teats and drawing the milk therefrom, and also that a pulsating or varying suction is caused to act on the cow's teats through, (1st) the full opening of the passage 24, Fig. 7, to suction so as to give the maximum suction and then, (2nd) the closing thereof to suction, and, the admission of a small amount of air to give the minimum suction. The nozzle 23 is only used for supplying air to the teat cup connector, or to the teat cups if so desired, for the purpose of driving the milk into the milk pail without surging or churning in the milk pipe. The small perforated grating 21 serves to exclude dust and dirt from the air passage 17 and the plunger 9. Precisely the same action takes place with the plunger 8 and its connections as will be readily understood.

The milk discharge when double chambered teat cups are used passes from the one cow through the opening 27 in the hood 26 and from the other cow through the opening 28 in the hood 26 the milk of the one cow being separated from that of the other cow owing to the fact that the pail is divided into two compartments by means of the partition 84 which partition passes between the openings 27 and 28.

When the apparatus is operating with the single chambered teat cups then the milk from the teat cups of the one cow passes through the chamber 15 of the plunger 9 into the one compartment of the milk pail while the milk from the other cow passes by the chamber 15 in the plunger 8 into the other compartment of the milk pail.

When operating with double chambered teat cups a claw or teat cup connector such as shown at Figs. 17 and 18 is preferably used, the air supply for driving the milk into the milk pail being admitted through a small air opening 83 in the teat cup connector. I have found in practice that it is an advantage to make the air tube 78 of the teat cup connector also with a small air opening 82 which admits a restricted amount of air to the air chambers of the teat cups and reduces the vacuum therein more quickly thereby giving a more decided action. Of course any suitable well-known claw or teat cup connector can be used and instead of having an air hole 82 a small air admission valve can be arranged in lieu thereof.

It will be seen that with this apparatus:—
1st. That when double chambered teat cups are used milking can be carried on by means of a constant suction in the milk chambers of the teat cups and a variable or pulsating suction in the air chambers of the teat cups when the milk pipe is connected to the nozzle 30 (or 29 as the case may be) and the air pipe connected to the nozzle 25 (or 25ª as the case may be). 2nd. That the milking can be carried on with a pulsating or varying suction in the milk chambers of the teat cups and a constant suction in the air chambers of the teat cups the milk pipe in this case being connected to the cock 25 (or 25ª as the case may be) and the air pipe being connected to the cock 30 (or 29 as the case may be). 3rd. That the milking operation can be carried on by means of single chambered teat cups the milk pipe in such case being connected to the cock 25 (or 25ª as the case may be) and the air pipe being connected to the nozzle 23 (or 23ª as the case may be). 4th. That, if so desired the milking operation can be carried on with double chambered teat cups for the one cow and single chambered teat cups for the other cow.

When milking with single chambered teat cups, air is admitted to the claw only at high vacuum and the air inlet to the claw and the milk outlet both being closed at low vacuum.

When it is desired to use the apparatus for milking only one cow the cocks at one side can be closed and those at the other side alone employed.

It is found in practice that the people who generally perform the milking operation have no mechanical training and make mistakes in connecting the milk tube and the air tubes and in some cases thereby cause considerable trouble. With this apparatus no damage can be done by mis-connection of the tubes as if the milk tube is connected by mistake to the cock 25 instead of to the cock 30 (or the cock 25ª instead of the cock 29) then the milk will still flow to the pail under pulsating suction through the opening in the plunger. Again, should the mistake be made of connecting the milk tube to the cock 30 instead of the cock 25 or the cock 29 (instead of cock 25ª) then the milk would still flow to the pail through the openings in the hood 26. The connection of a pipe to the nozzles 23 or 23ª would give no suction so that milk could not be drawn into said nozzles, the nozzles being simply air inlet nozzles.

The mechanism for operating the oscillating valve 57 is an improvement upon that at present in use as it is not so liable to get out of order.

Having now fully described my invention what I claim and desire to secure by Letters Patent is:—

1. In a pneumatic milking machine adapted to operate with double chambered teat cups, means for producing, as desired, either a constant suction in the milk chambers of the teat cups and a variable suction in the air chambers thereof or vice versa.

2. In a pneumatic milking machine adapted to operate with both single and double chambered teat cups, means for producing, as desired, either a constant suction in the milk chambers of the double chambered teat cups and a variable suction in the air chambers thereof or vice versa and means for producing a variable suction in the single chambered teat cups.

3. In a pneumatic milking machine adapted to operate with either single or double chambered teat cups, means for producing, as desired, either a constant suction in the milk chambers of the double chambered teat cups and a variable suction in the air chambers thereof or vice versa and means for producing a variable suction in the single chambered teat cups.

4. In a pneumatic milking machine, pulsating mechanism comprising, in combination, a base, two cylinders thereon, a plunger in each cylinder for causing the vacuum to vary at the teat cups, means for connecting the plungers together so that they operate simultaneously and pneumatically operated means for reciprocating the plungers.

5. In a pneumatic milking machine, pulsating mechanism comprising, in combination, a base, two cylinders thereon, a plunger in each cylinder for causing the vacuum to vary at the teat cups, means for connecting the plungers together so that they operate simultaneously and pneumatically operated means connected with said connecting means for reciprocating the plungers.

6. In a pneumatic milking machine, pulsating mechanism comprising, in combination, a base, two cylinders arranged vertically thereon and side by side, a plunger in each cylinder for causing the vacuum to vary at the teat cups, means for connecting the plungers together so that they operate simultaneously and pneumatically operated means for reciprocating the plungers.

7. In a pneumatic milking machine, pulsating mechanism comprising, in combination, a base, two cylinders arranged vertically thereon and side by side, a plunger in each cylinder for causing the vacuum to vary at the teat cups, a cylinder on top of said plunger cylinders and common to both, means for connecting the plungers together so that they operate simultaneously, a diaphragm in the cylinder and which is attached to the connecting means and is operated pneumatically.

8. In a pneumatic milking machine, pulsating mechanism comprising, in combination, a base, two cylinders each open at their upper and lower ends mounted on said base and having suction and air ports therein, a plunger in each cylinder having ports therein capable of registering with the ports of the cylinder, means connecting the two plungers together, and pneumatic means for operating the plungers simultaneously.

9. In a pneumatic milking machine, pulsating mechanism comprising, in combination, a base, two cylinders each open at their upper and lower ends mounted on said base and having suction and air ports therein, a plunger in each cylinder having a hollow chamber at its lower end and which is open at one side and the bottom thereof and an air passage above said chamber, means connecting the two plungers together, and pneumatic means for operating the plungers simultaneously.

10. In a pneumatic milking machine, pulsating mechanism comprising, in combination, a base, two cylinders each open at their upper and lower ends mounted on said base and having suction and air ports therein, a plunger in each cylinder having a hollow chamber at its lower end and which is open at one side and the bottom thereof and a cross air passage above said chamber said air passage having downwardly extending extensions at each end thereof, means connecting the two plungers together, and pneumatic means for operating the plungers simultaneously.

11. In a pneumatic milking machine, pulsating mechanism comprising, in combination, a base, two cylinders thereon, each cylinder having at one side thereof an air port and a vacuum port and at the opposite side thereof an air port, a plunger in each cylinder having an air passage and a vacuum space therein, the air passage and the vacuum space being adapted to connect with the air and vacuum ports of the cylinder, means for connecting the plungers together so that they operate simultaneously and pneumatically operated means for reciprocating the plungers.

12. In a pneumatic milking machine, having a milk receptacle in which a vacuum can be created and which is divided into two compartments, a pulsating apparatus comprising, in combination, a base plate adapted to fit the mouth of the receptacle, cocks on the base plate communicating with each compartment of the receptacle, two open ended cylinders arranged vertically side by side of the base plate and each having air and vacuum ports therein, a plunger in each cylinder having air and vacuum ports therein, a cross head connecting the plungers together, a cylinder of larger diameter on the top of the aforesaid vertical cylinders, a diaphragm in the large cylinder for operating the plungers, and means for operating the diaphragm pneumatically.

13. In a pneumatic milking machine having a milk receptacle in which a vacuum can be created and which is divided into two compartments, a pulsating apparatus, comprising, in combination, a base plate adapted to fit the mouth of the receptacle, cocks on the base plate communicating with each compartment of the receptacle, two open ended cylinders arranged vertically side by side on the base plate and each having air and vacuum ports therein, a nozzle connecting with the air port of each cylinder, a cock connecting with the vacuum port of each cylinder, a plunger in each cylinder having air and vacuum ports therein, a cross-head connecting the plungers together, a cylinder of larger diameter on the top of the aforesaid vertical cylinders, a diaphragm for operating the plungers in the large cylinder, and means for operating the diaphragm pneumatically.

14. In a pneumatic milking machine, pulsating mechanism comprising, in combination, a base, two cylinders thereon, a plunger in each cylinder for causing the vacuum to vary at the teat cups, a crosshead connecting the plungers together, means for operating the crosshead and plungers, a bar depending from the crosshead, a lever operated by said bar, and means for locking the lever.

15. In a pneumatic milking machine, pulsating mechanism comprising, in combination, a base, two cylinders thereon, a plunger in each cylinder for causing the vacuum to vary at the teat cups, a cross-head connecting the plungers together, means for operating the crosshead and plungers, and means for locking the crosshead and plungers.

16. In a pneumatic milking machine, pulsating mechanism, comprising, in combination, a base, two cylinders thereon, a plunger in each cylinder for causing the vacuum to vary at the teat cups, a crosshead connecting the plungers together, means for operating the crosshead and plungers, a bar depending from the crosshead, a bracket on one cylinder, a lever fulcrumed in said bracket and operated by said bar, and a catch for locking the lever.

17. In a pneumatic milking machine, pulsating mechanism comprising, in combination, a base, two cylinders thereon, a plunger in each cylinder for causing the vacuum to vary at the teat cups, a crosshead connecting the plungers together, means for operating the crosshead and plungers, a bar depending from the crosshead, a lever operated by said bar, a bracket on the base, a bell crank, a spring connecting the lever and bell crank, and a vacuum and air valve operated by said bell crank.

18. In a pneumatic milking machine, pulsating mechanism comprising, in combination, a base, two cylinders thereon, a plunger in each cylinder for causing the vacuum to vary at the teat cups, a crosshead connecting the plungers together, means for operating the crosshead and plungers, a bar depending from the crosshead, a lever operated by said bar, a bracket on the base, a bell crank, a spring connecting the lever and bell crank, a bar with two arms and operated by the bar of the crosshead for positively actuating the bell crank, and a vacuum and air valve operated by said bell crank.

In testimony whereof I affix my signature in presence of two witnesses.

ROBERT KENNEDY.

Witnesses:
A. D. FITZPATRICK,
MARGARET FINDLAY YOUNG.